(12) United States Patent
Yan et al.

(10) Patent No.: US 12,158,928 B1
(45) Date of Patent: Dec. 3, 2024

(54) COMMUTATIVE ENCRYPTION AND WATERMARKING METHOD BASED ON CHAOTIC SYSTEM AND ZERO WATERMARK FOR VECTOR GEOSPATIAL DATA

(71) Applicant: LANZHOU JIAOTONG UNIVERSITY, Lanzhou (CN)

(72) Inventors: Haowen Yan, Lanzhou (CN); Liming Zhang, Lanzhou (CN); Jingzhong Li, Lanzhou (CN); Shuwen Yang, Lanzhou (CN); Tao Tan, Lanzhou (CN); Zufeng Li, Lanzhou (CN); Xiaomin Lu, Lanzhou (CN); Weifang Yang, Lanzhou (CN)

(73) Assignee: LANZHOU JIAOTONG UNIVERSITY, Lanzhou (CN)

( * ) Notice: Subject to any disclaimer, the term of this patent is extended or adjusted under 35 U.S.C. 154(b) by 0 days.

(21) Appl. No.: 18/743,120

(22) Filed: Jun. 14, 2024

(30) Foreign Application Priority Data

Jun. 16, 2023 (CN) .......................... 202310716559.3

(51) Int. Cl.
  *G06F 21/16* (2013.01)
  *G06F 21/60* (2013.01)
  *G06T 1/00* (2006.01)

(52) U.S. Cl.
  CPC ............ *G06F 21/16* (2013.01); *G06F 21/602* (2013.01); *G06T 1/005* (2013.01)

(58) Field of Classification Search
  None
  See application file for complete search history.

(56) References Cited

U.S. PATENT DOCUMENTS

| | | | | |
|---|---|---|---|---|
| 9,218,638 | B2* | 12/2015 | Mehta | G06T 1/0028 |
| 11,514,735 | B2* | 11/2022 | Kloepfer | G07C 9/26 |
| 12,073,486 | B1* | 8/2024 | Yan | G06T 17/00 |
| 2011/0311042 | A1* | 12/2011 | Cheddad | H04L 9/0656 380/28 |
| 2013/0259294 | A1* | 10/2013 | Mehta | G06T 1/0028 382/100 |

(Continued)

OTHER PUBLICATIONS

Yinguo Qiu, Hehe Gu, Jiuyun Sun, Hongtao Duan, Juhua Luo, "Rich-information watermarking scheme for 3D models of Oblique Photography", Multimedia Tools and Applications 78 (Jul. 17, 2019): 31365-31386. (Year: 2019).*

*Primary Examiner* — Kaveh Abrishamkar

(57) ABSTRACT

Disclosed in the present disclosure is a commutative encryption and watermarking method based on a chaotic system and a zero watermark for vector geospatial data. According to the method, firstly, the vector geospatial data are scrambled and encrypted by using chaotic sequences generated by a composite chaotic system. Then, vector geospatial elements are randomly combined in pairs. A feature matrix is constructed according to the number of vertex coordinates of the vector geospatial elements in combinations, and the parity of the number. Finally, an XOR operation is performed on the feature matrix and the watermark image to construct a zero watermark image, and the zero watermark is constructed through invariant features of the vector geospatial data.

5 Claims, 21 Drawing Sheets

(56) References Cited

U.S. PATENT DOCUMENTS

2015/0012339 A1* 1/2015 Onischuk ............... G07C 13/00
 235/386
2018/0350180 A1* 12/2018 Onischuk ............... G07C 13/00
2021/0304348 A1* 9/2021 Li ......................... G06T 1/0028

* cited by examiner

COMMUTATIVE ENCRYPTION AND WATERMARKING METHOD BASED ON CHAOTIC SYSTEM AND ZERO WATERMARK FOR VECTOR GEOSPATIAL DATA

TECHNICAL FIELD

The present disclosure belongs to the technical field of geographic information security, and relates to a commutative encryption and watermarking method based on a chaotic system and a zero watermark for vector geographic data.

BACKGROUND

Serving as one of the new infrastructures of national economic construction and national defense construction, vector geographic data are widely used in the fields such as navigation and urban planning. With development of the information network technology, transmission of the vector geographic data becomes simpler, but leakage and illegal duplication of the vector geographic data also become more frequent. In order to solve the increasingly serious problem of geographic information security, a series of laws and regulations have been formulated at the national level. However, the behavior of endangering the security of the vector geographic data often occurs, and therefore, in order to better protect the security of the vector geographic data, it is necessary to perform protection from the technical level.

Encryption and digital watermarking are two main technologies to protect the security of the vector geographic data. The encryption technology can ensure the security of the vector geographic data in a ciphertext state. Only authorized users can decrypt and access the original vector data after encryption. The digital watermarking technology embeds copyright information in the vector geographic data to realize copyright protection and traceability of the vector geographic data. In 2020, Ren Na proposed a commutative encryption and watermarking method based on feature invariants. The watermark capacity of this method is small, the robustness of conventional attacks is limited, and due to a calculation and storage mechanism of computers, a slight impact will be caused on data accuracy. In 2021, Li Yu proposed a double random scrambling type commutative encryption and watermarking method, which is not suitable for high-precision vector geographic data because of watermark embedding and has limited robustness to conventional attacks. The combination of the encryption technology and the watermarking technology can not only ensure the security of the vector geographic data in a transmission process, but also confirm the copyright and realize traceability, which can better protect the security of the vector geographic data. The existing commutative encryption and watermarking methods for vector geographical data have the following defects: the existing methods mainly employ embedded watermarks, which cannot satisfy the demands of high-precision data, the robustness to conventional attacks such as geometric attacks, projection attacks, reordering attacks is insufficient, and the watermark capacity is relatively small.

Scrambling encryption is a cryptographic encryption technology, which can achieve an encryption effect by changing spatial features and topological relationships of the vector geographic data. Zero watermarks are non-embedded watermarks, which extract stable features of the vector geographic data to construct feature matrices, and an XOR operation with watermark information is performed to obtain zero watermark images. The present disclosure combines zero watermarks and scrambling encryption for the first time, which ensures that the zero watermarks and the scrambling encryption do not cause any influence on the precision of high-precision vector geographic data, and can resist various conventional attacks. Moreover, this method is not only applicable to the vector geographic data, but also to vector data with similar structures represent by CAD data.

SUMMARY

An objective of the present disclosure is to provide a method based on a chaotic system and a zero watermark with an exchangeable sequence of watermark image construction and data encryption for vector geographic data, so as to achieve copyright protection on high-precision vector geographic data in the storage, transmission and use processes.

In order to achieve the above objective, the present disclosure provides the solutions as follows:

A zero watermark generation method for vector geographic data includes:
  performing scrambling on a copyright image to obtain a binary copyright matrix;
  performing coordinate system transformation on a vector geospatial element set to obtain a transformed vector geospatial element set;
  performing random combination on vector geographic elements in pairs;
  calculating a watermark index according to the vertex coordinate number of two elements randomly combined;
  based on a voting principle, constructing a feature matrix by comparing whether the parity of the vertex coordinate numbers of the two elements randomly combined is the same; and
  performing an XOR operation on the feature matrix and the binary copyright matrix to obtain a zero watermark image.

A zero watermark information detection method includes:
  reading vector geographic data to be detected;
  generating an element feature matrix of vector geographic elements to be detected by using the aforementioned zero watermark generation method for vector geographic data;
  performing an XOR operation on the element feature matrix of the vector geographic element set to be detected, and a zero watermark of an original copyright image in an intellectual property management agency to obtain a scrambled copyright image to be detected; and
  performing reverse scrambling on the scrambled copyright image to be detected.

An encryption method for vector geographic data includes:
  reading the vector geographic data, and performing coordinate system transformation on a vector geographic element set to obtain a transformed X and Y vector geographic element coordinate set;
  performing a hash operation on an initial key provided by a user by using an SHA-256 hash method, taking obtained 256-bit hash values as keys of a chaotic system and dividing same into 32 groups, and transforming same into a decimal system respectively;
  calculating an auxiliary parameter d by using formula d=mod((sum×255), 32), comparing all values of 32 integers with the dth digit, setting the value as 1 if the value is greater than d, or else setting the value as 0, where mod represents a remainder operator, and sum represents the total number of coordinates of the vector geographic data;

dividing comparison results into 4 groups which is represented by $K_1'$, $K_2'$, $K_3'$, $K_4'$ respectively, and combining same in pairs, so as to correspond to 5 parameters in a double chaotic system, namely, three chaotic variables $X_0$, $Y_0$, $x_0$ and two control variables $\mu$, $\beta$ of the double chaotic system; performing decimal transformation in sequence as initial values of the double chaotic system, and generating chaotic sequences by means of iterations, where the bin2dec function transforms a binary system into a decimal system, $\oplus$ represents an XOR operator symbol, and a calculation method is shown in the following formula:

$$\begin{cases} X_0 = bin2dec(K_1' \oplus K_2')/256 \\ Y_0 = bin2dec(K_1' \oplus K_3')/256 \\ x_0 = bin2dec(K_1' \oplus K_4')/256 \\ \mu = bin2dec(K_2' \oplus K_3')/256 + 1 \\ \beta = bin2dec(K_3' \oplus K_4')/512 \end{cases}$$

performing N+S iterations according to the initial values of the chaotic system and the number of vertex coordinates of the single vector geographic element or the total number of vertex coordinates of the vector data, where S represents the number of vertex coordinates of the single element or the sum of vertex coordinates of the entire vector data;

discarding the previous N iterations, which is marked as $L=\{l_1, l_2, \ldots, l_n\}$, and rounding the chaotic sequence in S according to the following formula, where mod represents a remainder operator, $\lfloor \ \rfloor$ represents a downward rounding operator, $l_i$ represents an iteration value, and n represents the number of vertex coordinates of the single element or the sum of vertex coordinates of the entire vector data; and $$L_i = \mathrm{mod}(\lfloor (l_i \times n) \rfloor, n), i \in \{1, 2, \ldots n\}$$

performing scrambling encryption on the storage sequence of the vertex coordinates of the vector geographic data elements by using the chaotic sequences in order from 1 to n first, and then performing scrambling recombination on X and Y values of the vertex coordinates by using different chaotic sequences.

A decryption method for vector geographic data includes:
reading the vector geographic data to be decrypted;
generating an identical chaotic sequences on the basis of the aforementioned encryption method for vector geographic data; and
performing reverse scrambling recombination on the X and Y values of the vertex coordinates of the vector geographic data elements by using different chaotic sequences in order from n to 1 first, and then performing reverse scrambling decryption on the storage sequence of the vertex coordinates by using the chaotic sequence.

A commutative encryption and watermarking method based on a chaotic system and a zero watermark for vector geographic data is disclosed in the present disclosure. According to the method, the vector geographic elements are encrypted by using the chaotic sequences generated by the chaotic system, and the zero watermark image is constructed by using the feature invariant, namely the number of vertexes of the vector geographic elements, such that it is ensured that no influence is caused to precision of the vector geographic data, the safety is higher, the application range is wider, and the watermark capacity is larger, thereby providing a new effective solution for safe transmission and copyright protection of the high-precision vector geographic data.

BRIEF DESCRIPTION OF THE DRAWINGS

In order to more clearly describe the technical solutions in the present disclosure or the prior art, a brief introduction to the accompanying drawings required for the description of the examples or the prior art will be provided below. Obviously, the accompanying drawings in the following description are merely some accompanying drawings of the present disclosure. Those of ordinary skill in the art can also derive other accompanying drawings from these accompanying drawings without making creative efforts.

DETAILED DESCRIPTION OF THE EMBODIMENTS

The technical solutions in the examples of the present disclosure will be clearly and completely described below with reference to the accompanying drawings in the examples of the present disclosure. Obviously, the described examples are merely some examples rather than all examples of the present disclosure. All the other examples obtained by those of ordinary skill in the art based on the examples in the present disclosure without creative efforts shall fall within the scope of protection of the present disclosure.

Figure 1:
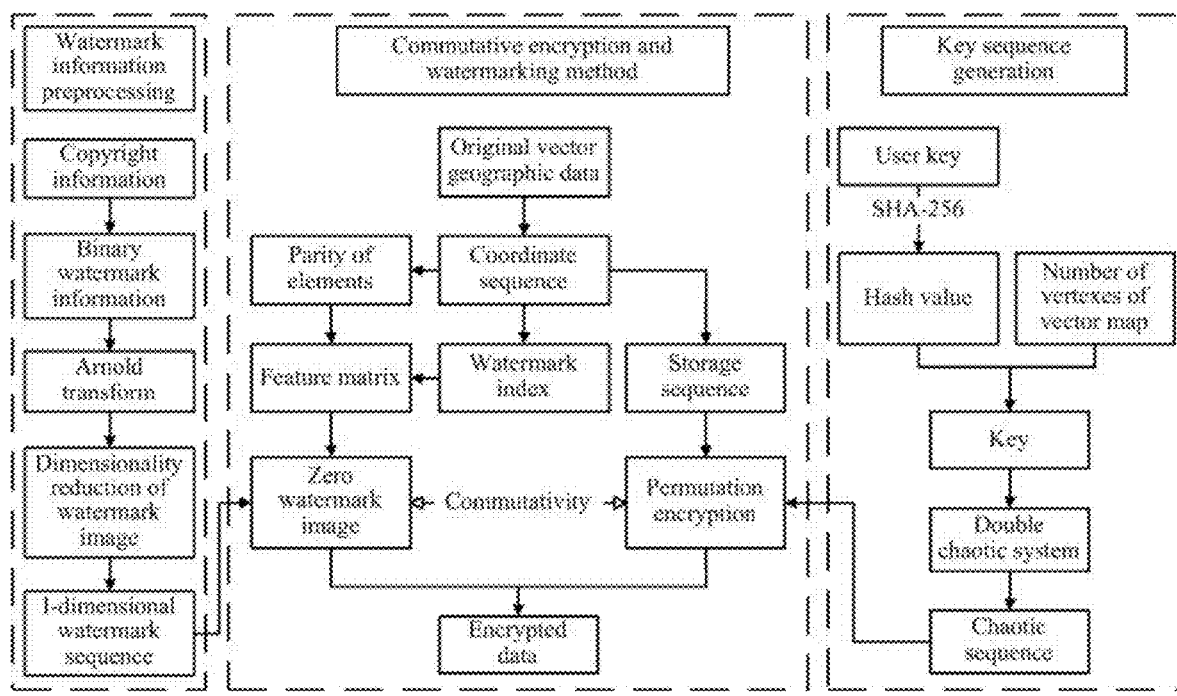
FIG. 1 is a concrete implementation process of a commutative encryption and watermarking method.

A commutative encryption and watermarking method based on a chaotic system and a zero watermark for vector geographic data is described in detail below in combination with the accompanying drawings and examples. The specific implementation process is shown in FIG. 1.

Example of zero watermark generation:

Reading an original binary watermark image, and applying Arnold transform to scramble the watermark image to obtain a scrambled watermark image.

Performing binarization on the scrambled watermark image to obtain a binary watermark sequence denoted by $W=\{w_i|w_i=0,1\}$, where $0 \leq i < N_w$, and $N_w$, is the length of a one-dimensional watermark sequence.

Figure 2A:
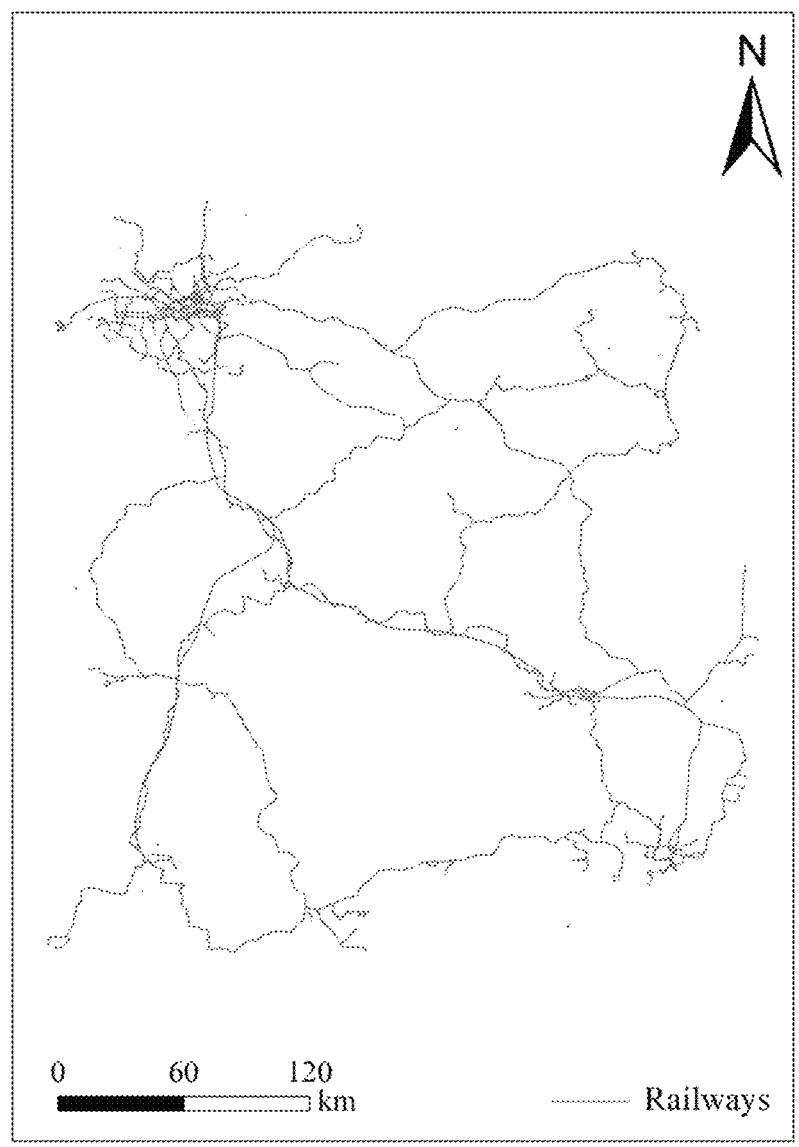
FIG. 2A shows vector map data of railways in a certain region.
Figure 2B:
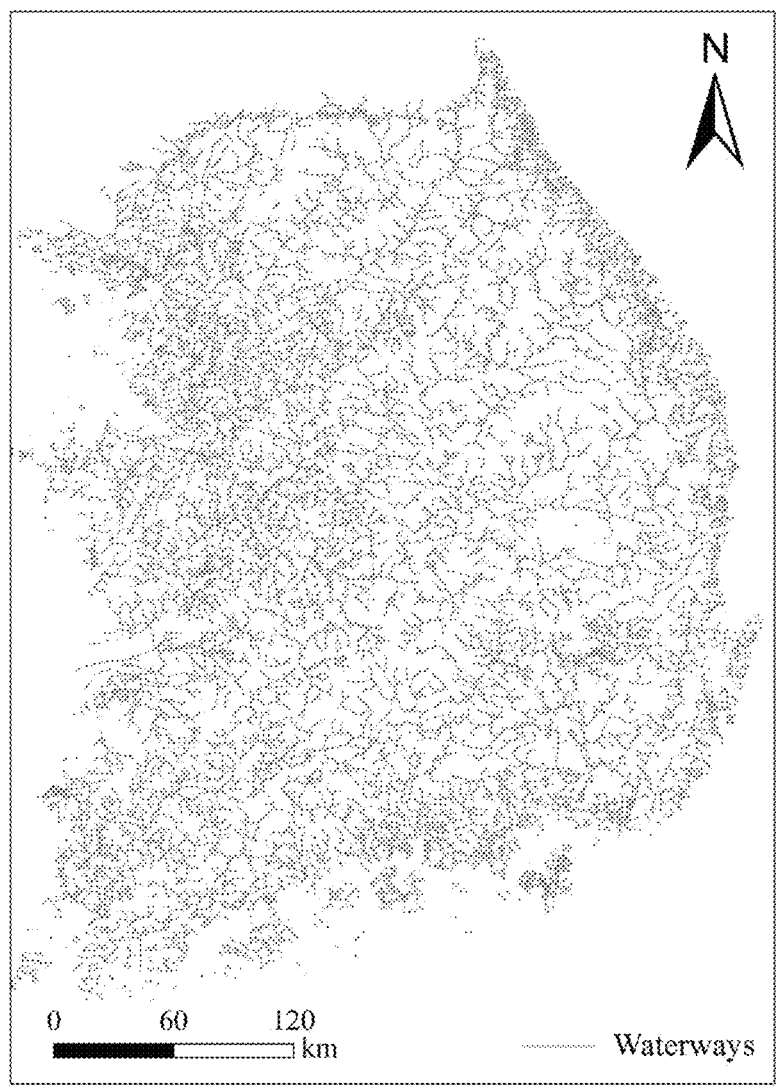
FIG. 2B is a vector map of waterways in a certain region.
Figure 2C:
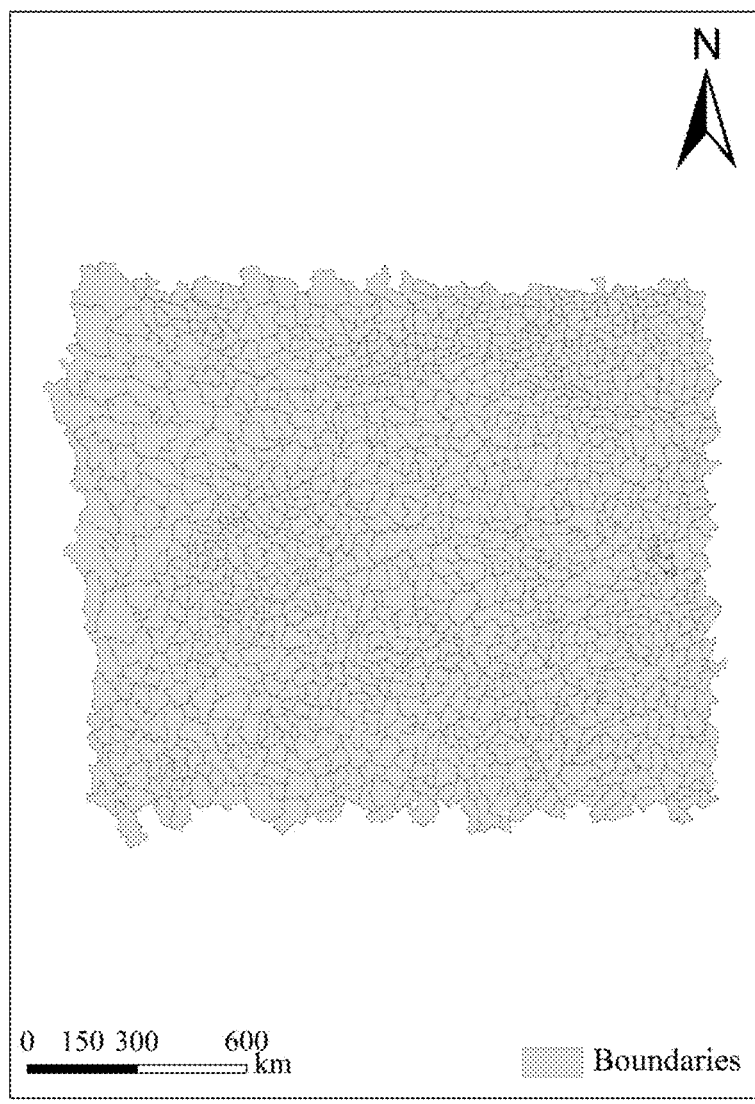
FIG. 2C is a vector map of boundaries in a certain region.

Performing coordinate system transformation on a vector geographic element set to obtain a transformed vector geographic element set. The data used in the implementation examples are shown in FIG. 2A-FIG. 2C.

In order to establish an index relationship between a feature matrix and watermark information, establishing an index relationship between each bit of watermark information and the feature matrix by means of Formula (1):

$$\text{index} = (N_i \times N_j) \bmod N_w, i,j \in \{0,1,\ldots,n-1\} \text{ and } i \neq j \quad (1).$$

In the formula, $N_w$ represents the length of one-dimensional watermark information, n represents the total number of vector geographic elements, and $N_i$ and $N_j$ represent the numbers of vertexes of different vector geographic elements in a combination.

Defining an integer sequence $W'=\{w_i'=0, i=1, 2, \ldots, N_W\}$ of the equal length to the watermark sequence is defined, where $N_w$ is the length of the one-dimensional watermark information. Since there are $(n-1)!$ combinations of vector geographical elements, the watermark may be embedded many times in an embedding process, that is, the mapping values index between different combinations of elements are the same. Therefore, a voting principle is employed to construct the feature matrix, and the specific calculation method is shown in Formula (2), where mod represents a remainder operator:

$$W'(\text{index}) = \begin{cases} W'(\text{index}) + 1, & \text{if } \bmod(N_i, 2) = \bmod(N_j, 2) \\ W'(\text{index}) - 1, & \text{if } \bmod(N_i, 2) \neq \bmod(n_j, 2) \end{cases} \quad (2)$$

Then, performing binarization on the integer sequence W' to form a one-dimensional feature matrix according to Formula (3):

$$W'(\text{index}) = \begin{cases} 1, & \text{if } W'(\text{index}) > 0 \\ 0, & \text{if } W'(\text{index}) \leq 0 \end{cases} \quad (3)$$

Figure 3A:
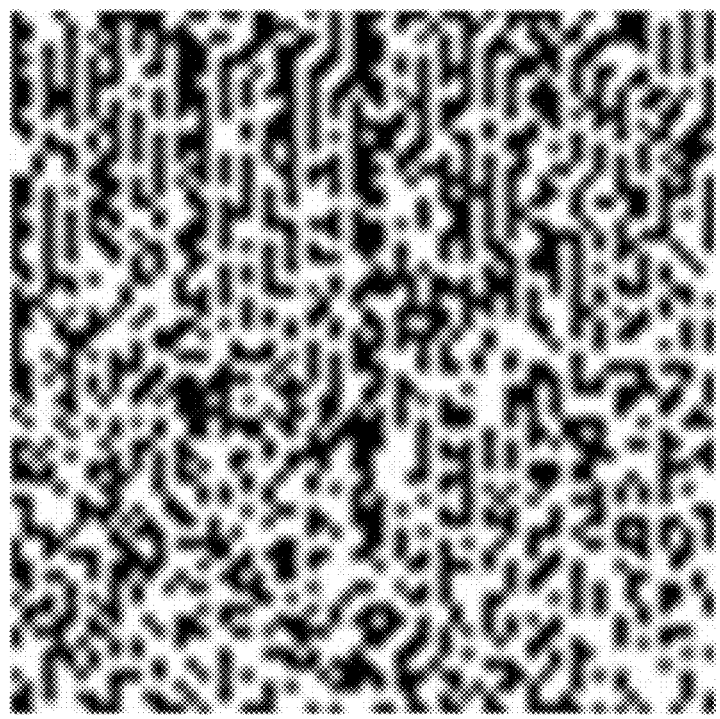
FIG. 3A is a zero watermark image generated corresponding to FIG. 2A.
Figure 3B:
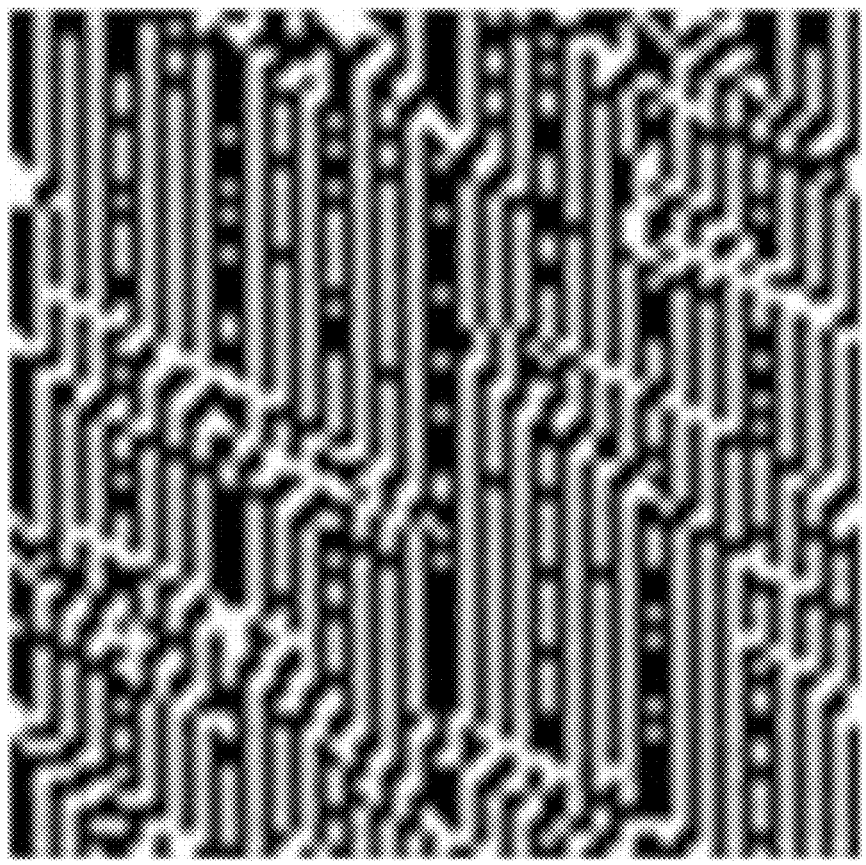
FIG. 3B is a zero watermark image generated corresponding to FIG. 2B.
Figure 3C:
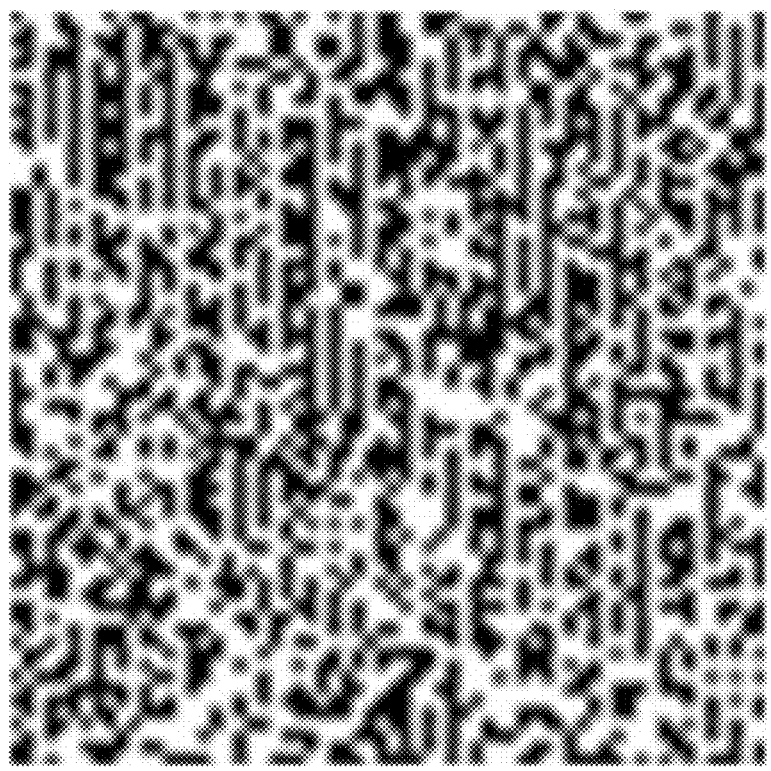
FIG. 3C is a zero watermark image generated corresponding to FIG. 2C.
Figure 4A:
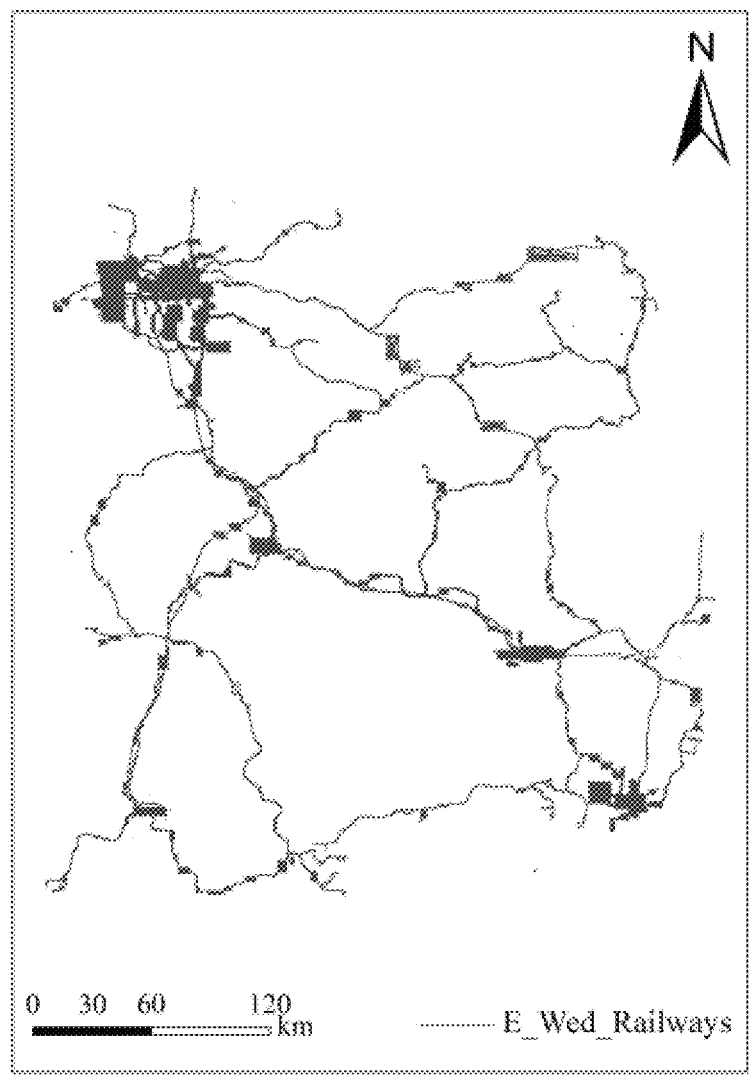
FIG. 4A shows an effect of sequentially encrypting sample data in FIG. 2A by single elements.
Figure 4B:
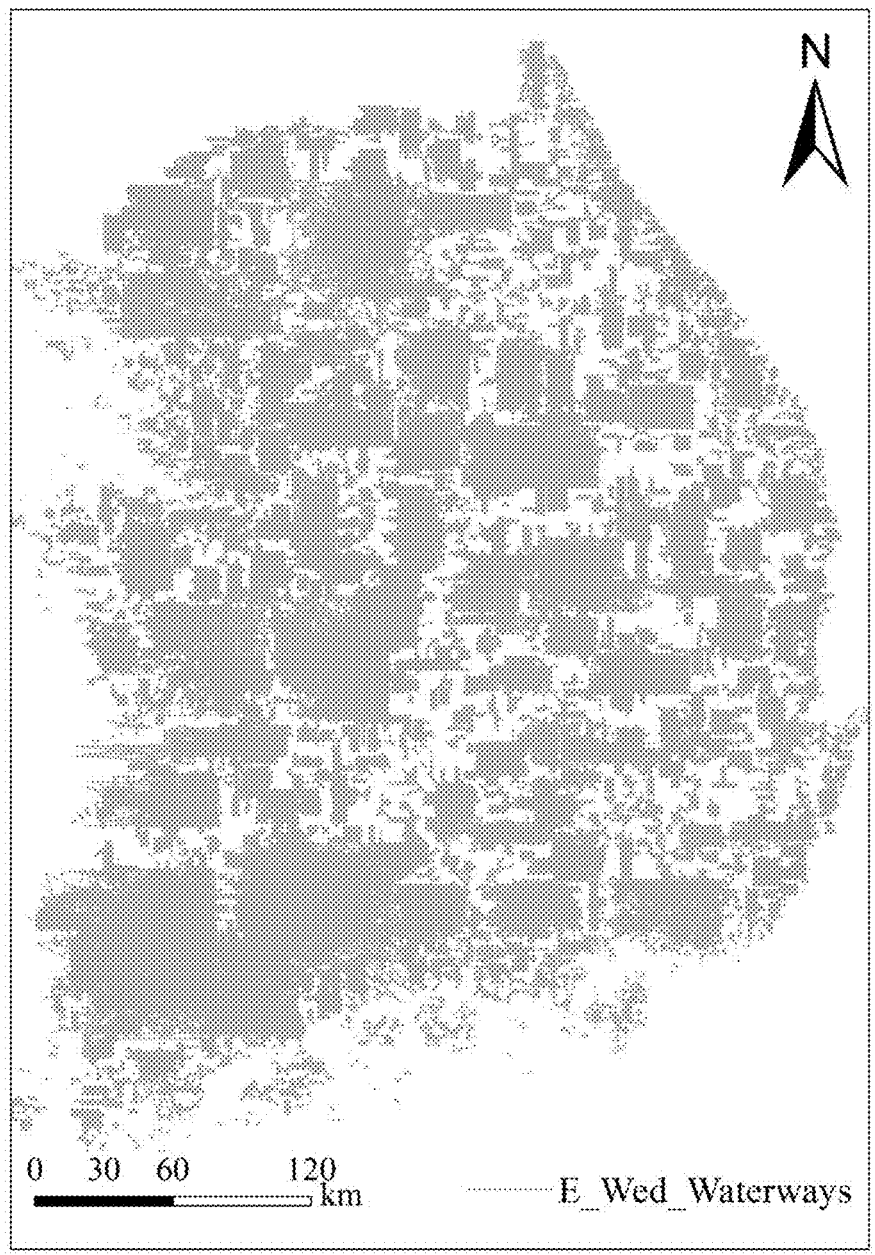
FIG. 4B shows an effect of sequentially encrypting sample data in FIG. 2B by single elements.
Figure 4C:
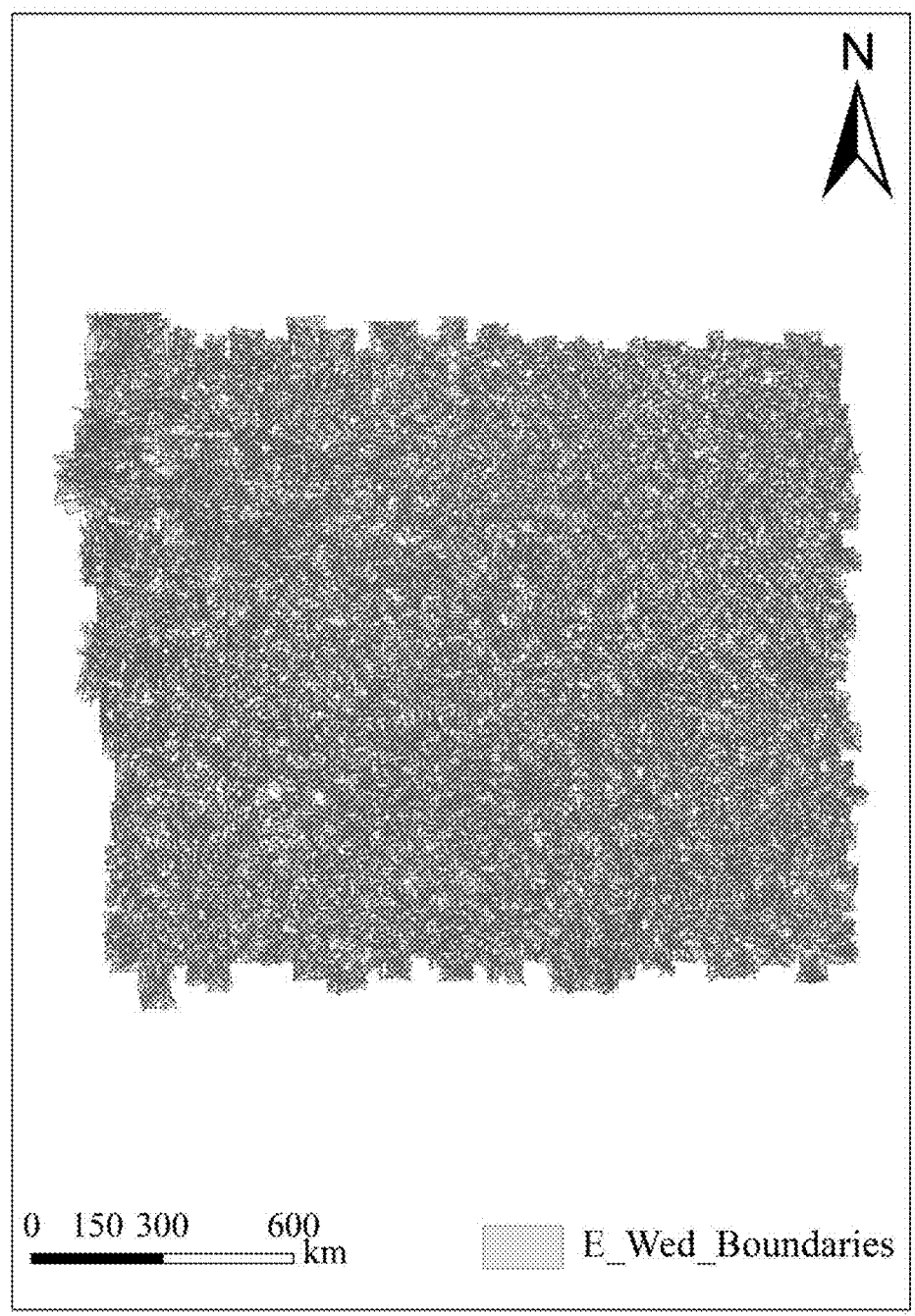
FIG. 4C shows an effect of sequentially encrypting sample data in FIG. 2C by single elements.
Figure 5A:
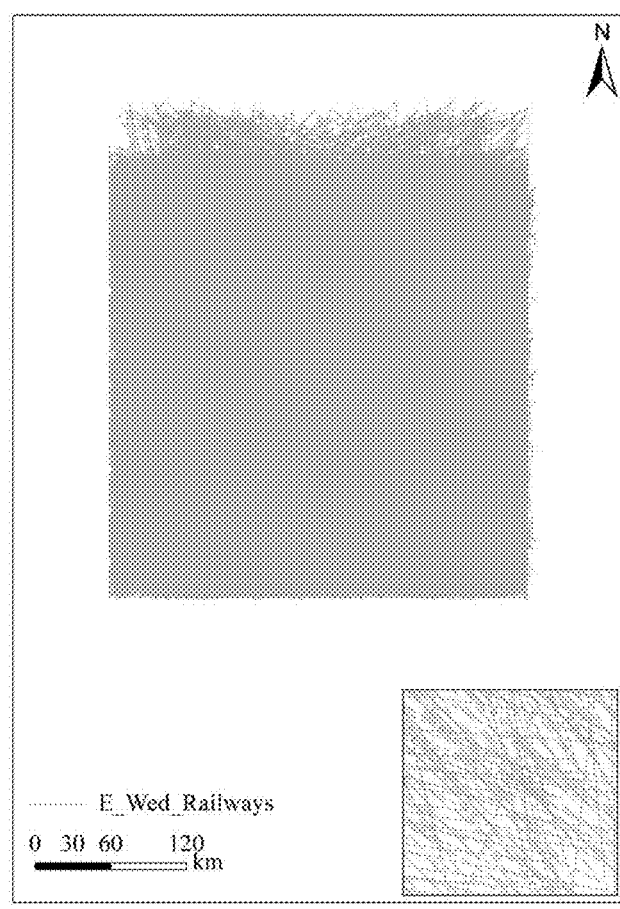
FIG. 5A shows an effect of simultaneously encrypting sample data in FIG. 2A by all elements.
Figure 5B:
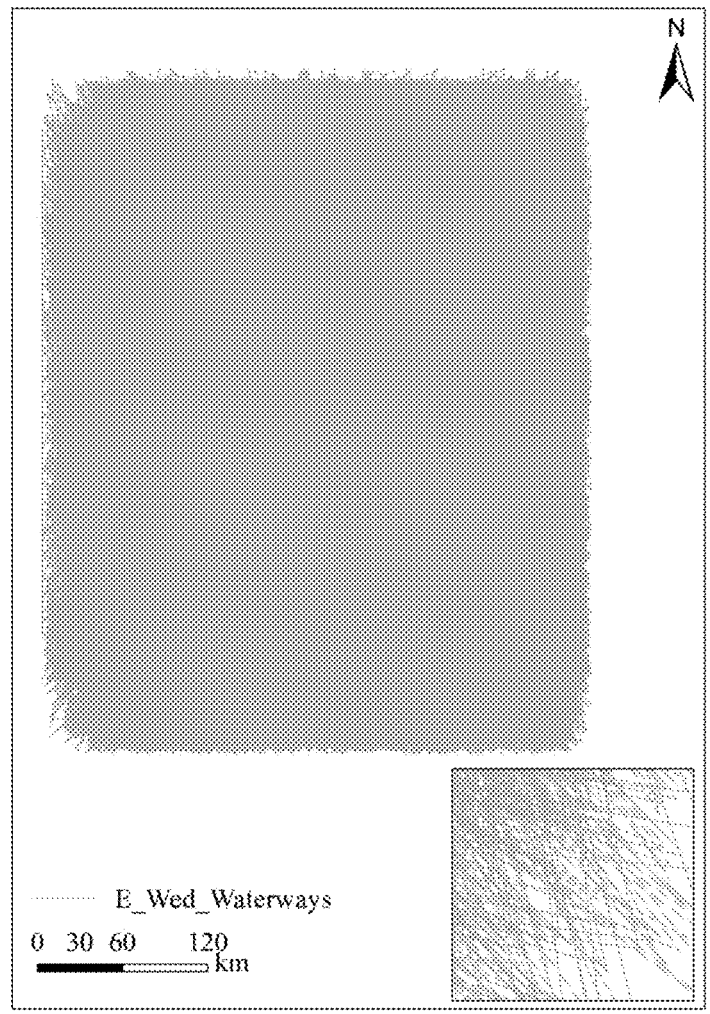
FIG. 5B shows an effect of simultaneously encrypting sample data in FIG. 2B by all elements.
Figure 5C:
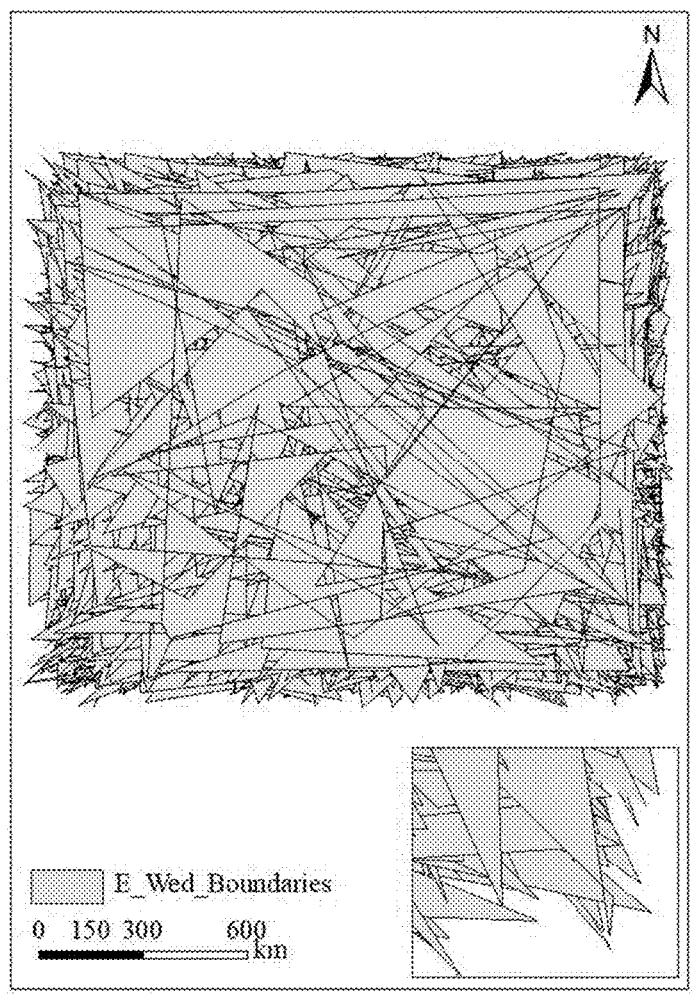
FIG. 5C shows an effect of simultaneously encrypting sample data in FIG. 2C by all elements.

Performing an XOR operation on the one-dimensional feature matrix W' and the watermark information W, and reconstructing the one-dimensional sequence after the XOR operation into a two-dimensional zero watermark image W*. As shown in FIG. 3A-FIG. 3C.

Example for extraction of zero watermark:

Reading vector geographic data to be detected.

Generating an element feature matrix of a vector geographic element set to be detected by using the aforementioned zero watermark generation example.

Performing an XOR operation on the element feature matrix of the vector geographic element set to be detected, and a zero watermark of the original copyright image in an intellectual property management agency to obtain a scrambled copyright image to be detected.

Performing reverse scrambling on the scrambled copyright image to be detected to obtain a detected copyright image.

Figure 6A:
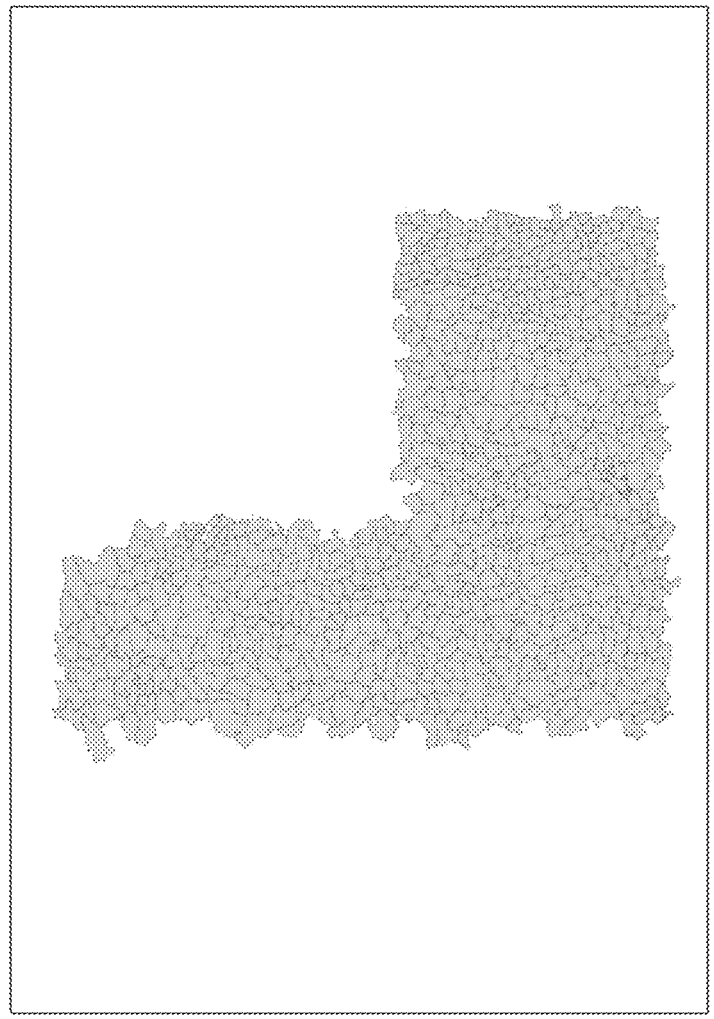
FIG. 6A shows a schematic diagram for performing a shearing attack on data in FIG. 2C.
Figure 6B:
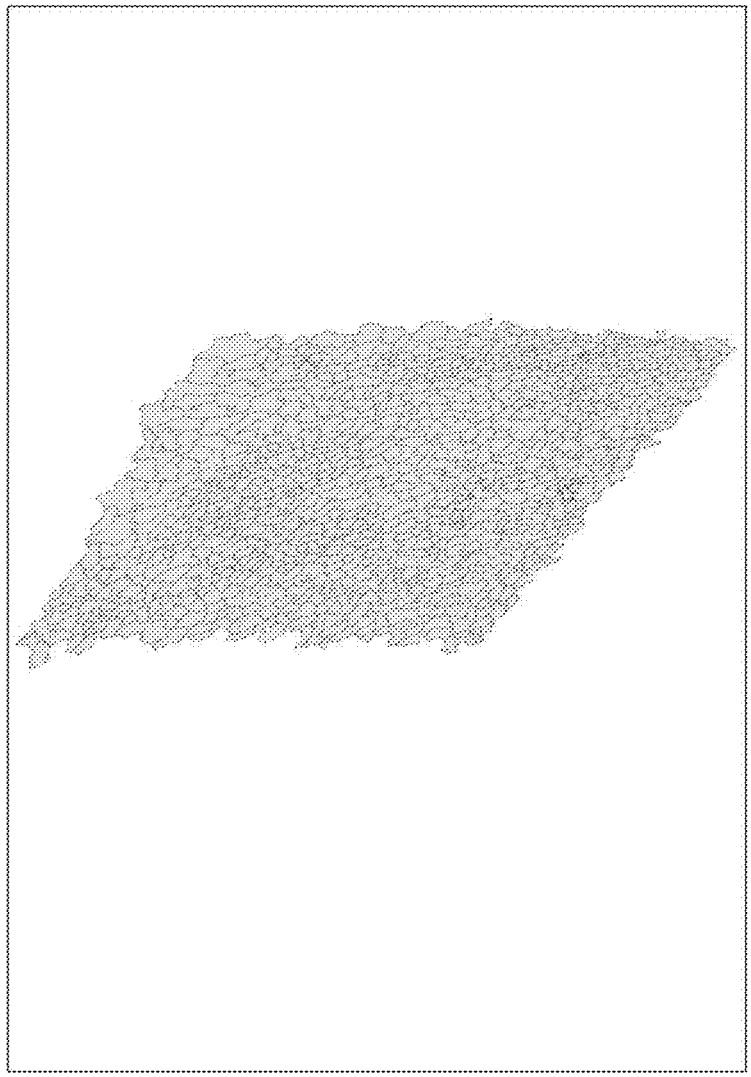
FIG. 6B shows a schematic diagram for performing a projection transformation attack on data in FIG. 2C.
Figure 6C:
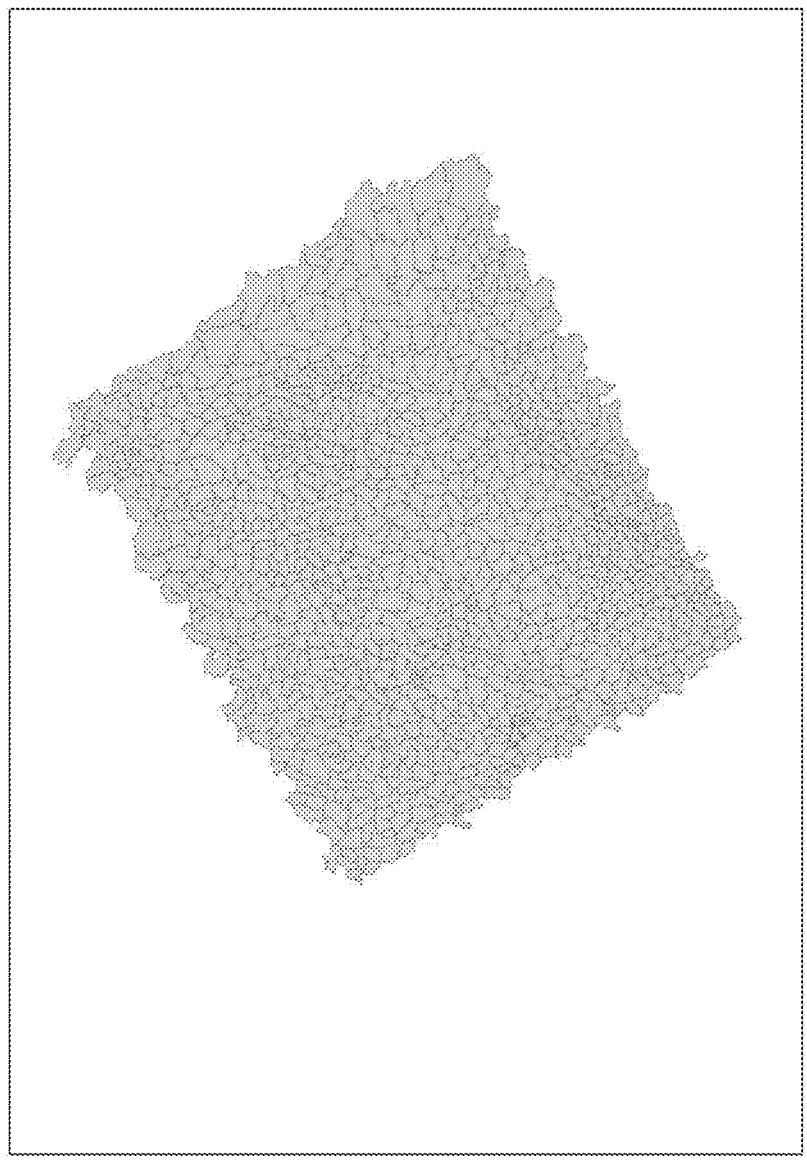
FIG. 6C shows a schematic diagram for performing a rotation attack on data in FIG. 2C.
Figure 7A:
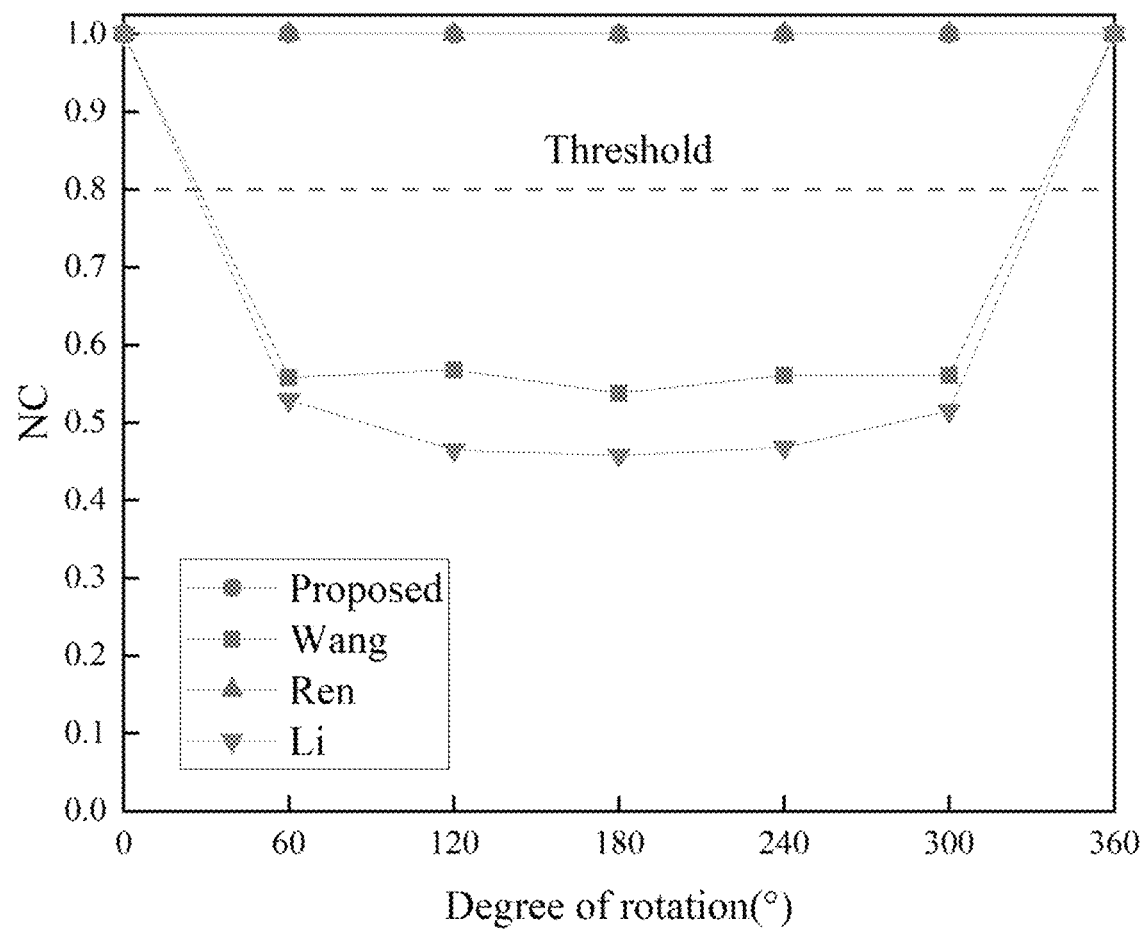
FIG. 7A shows a comparison diagram of robustness during a rotation attack using existing methods by taking data in FIG. 2C as an example.
Figure 7B:
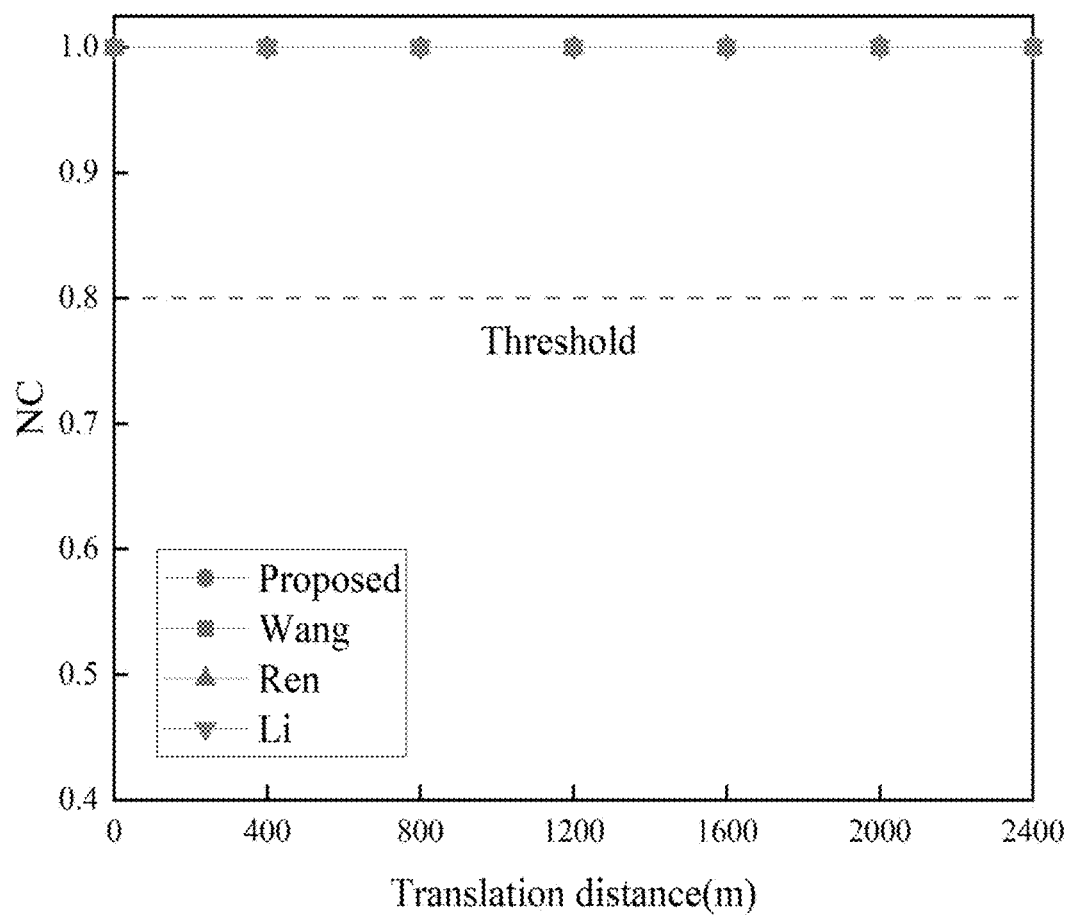
FIG. 7B shows a comparison diagram of robustness during a translation attack using existing methods by taking data in FIG. 2C as an example.
Figure 7C:
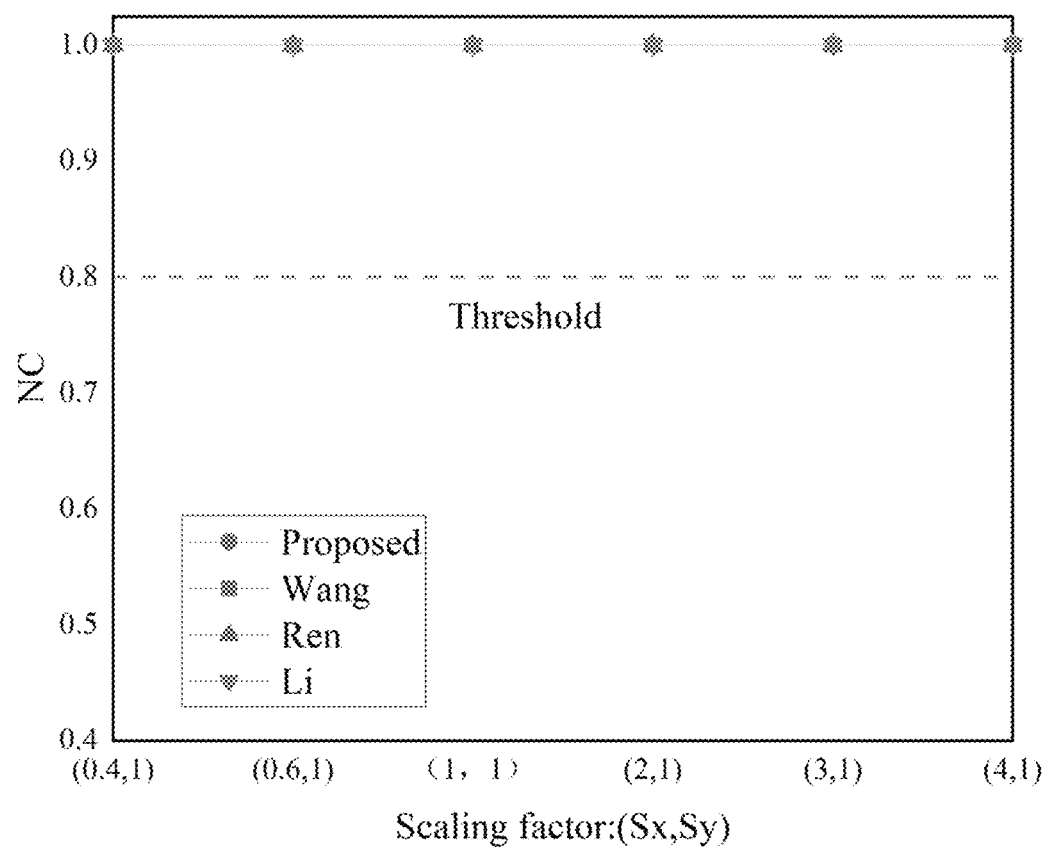
FIG. 7C shows a comparison diagram of robustness during a scaling attack using existing methods by taking data in FIG. 2C as an example.
Figure 7D:
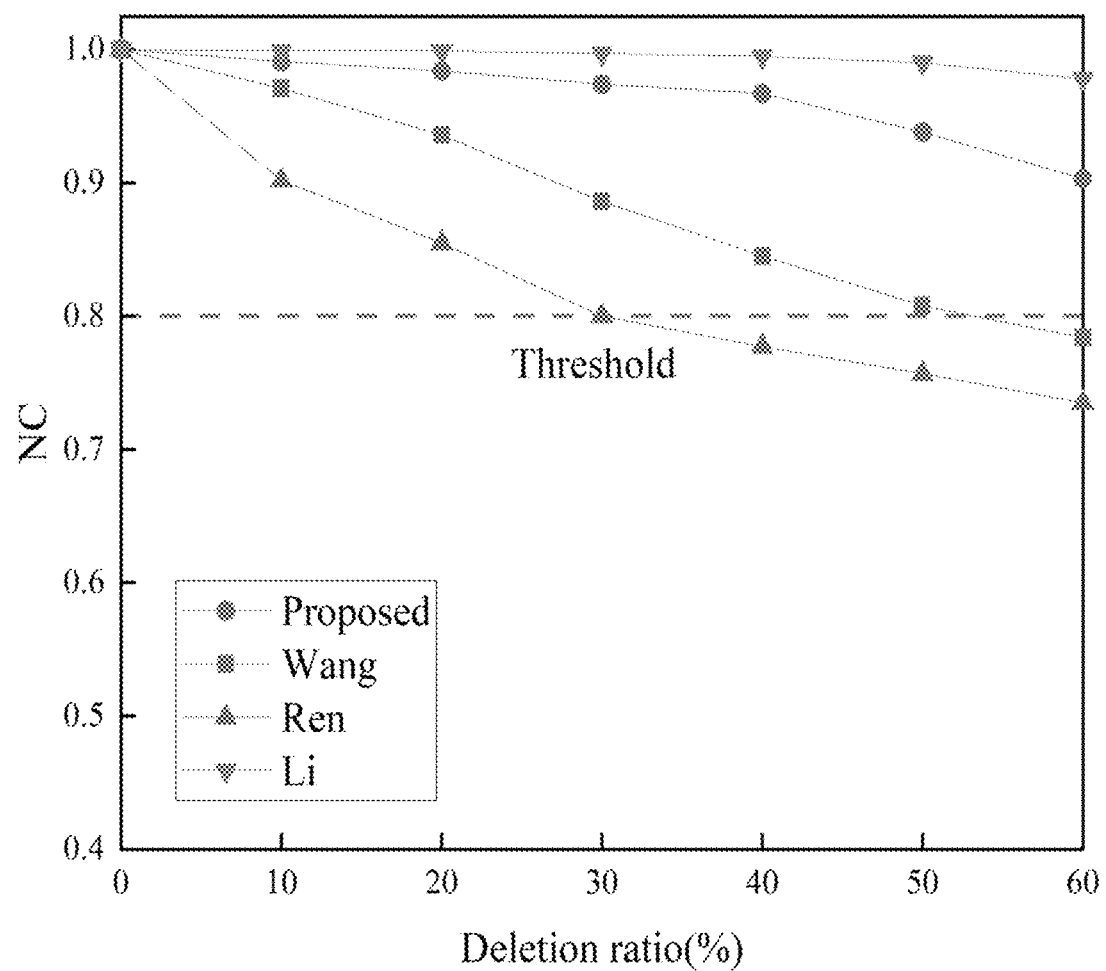
FIG. 7D shows a comparison diagram of robustness during a shearing attack using existing methods by taking data in FIG. 2C as an example.
Figure 7E:
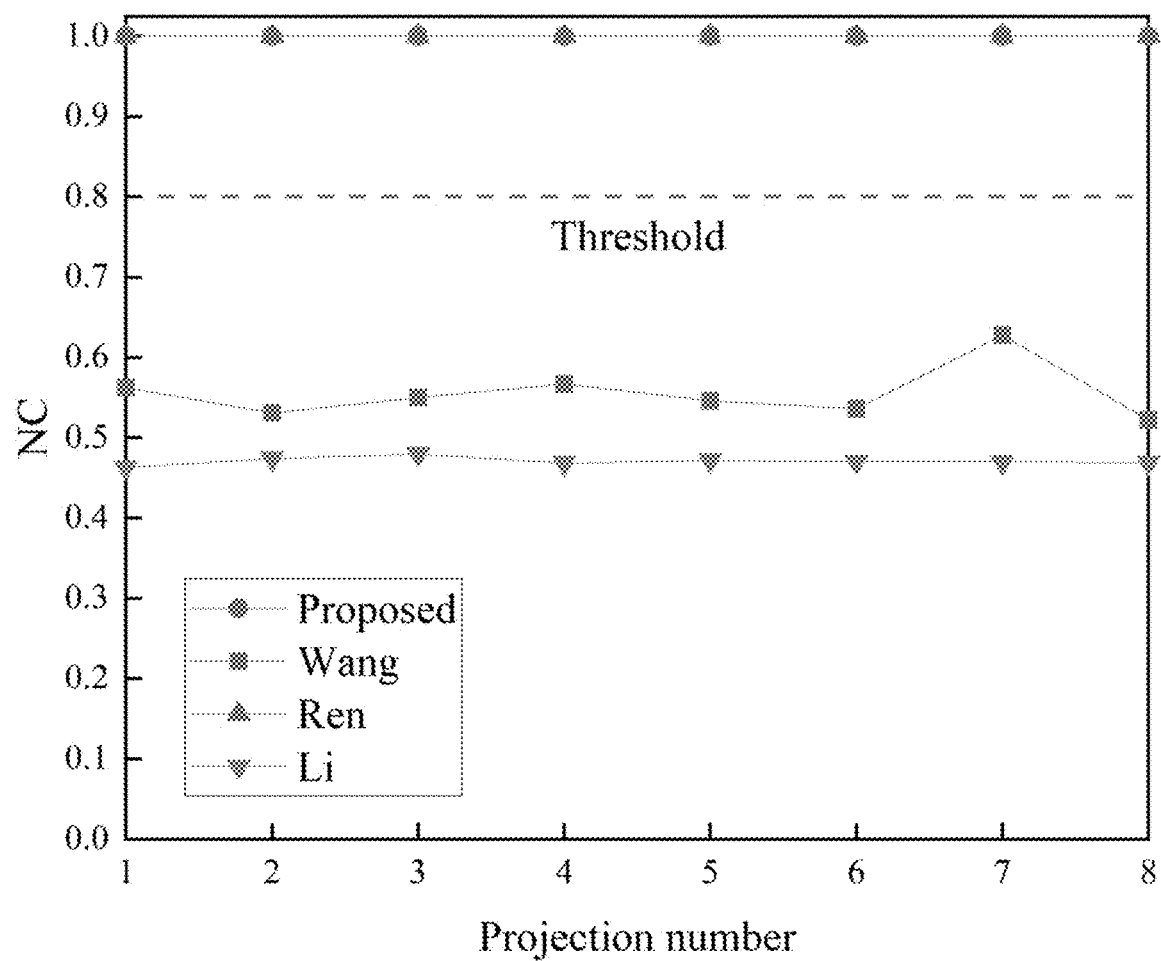
FIG. 7E shows a comparison diagram of robustness during a projection attack using existing methods by taking data in FIG. 2C as an example.

Attack FIG. 2C in the example data. The attack method is shown in FIG. 6A-FIG. 6C, and the robustness is compared with existing methods. The comparison results are shown in FIG. 7A-FIG. 7E.

Encryption example of vector geographic data:

Reading the vector geographic data, and performing coordinate system transformation on a vector geographic element set to obtain a transformed X and Y vector geographic element coordinate set.

Performing a hash operation on an initial key provided by a user by using an SHA-256 hash method, taking obtained 256-bit hash values as keys of a chaotic system and dividing same into 32 groups which is denoted by K, where $K=[k_1, k_2, \ldots, k_{32}]$, $k_i=\{k_{i1}, k_{i2}, \ldots, k_{i8}\}$, and $i=1, 2, \ldots, 32$. Converting same into a decimal system respectively.

Calculating an auxiliary parameter by using formula $d=\bmod((\text{sum} \times 255), 32)$, where the auxiliary parameter d represents an index value in K, sum represents the total number of vertex coordinates of the vector data, and mod represents a remainder operator. Performing comparison with all elements in K by taking the dth element in K as a comparison value, where if $k_d \leq k_i$, denoting is made as $k_i'=1$, and if $k_d > k_i$, denoting is made as $k_i'=0$, thereby obtaining a 32-bit sequence K' composed of 0 and 1, which is denoted as $K'=\{k_1', k_2', \ldots, k_{32}'\}$.

Dividing K' into 4 subsequences of the bit as $K_1'=\{k_1', k_2', \ldots, k_8'\}$, $K_2'=\{k_9', k_{10}', \ldots, k_{16}'\}$, $K_3'=\{k_{17}', k_{18}', \ldots, k_{24}'\}$ and $K_4'=\{k_{25}', k_{26}', \ldots, k_{32}'\}$.

Combining $K_1'$, $K_2'$, $K_3'$, $K_4'$ in pairs, so as to correspond to 5 parameters in a double chaotic system, namely, three chaotic variables $X_0$, $Y_0$, $x_0$ and two control variables $\mu$, $\beta$ of the double chaotic system; and performing decimal transformation in sequence as initial values of the double chaotic system, and generating chaotic sequences by means of iterations, where the bin2dec function transforms a binary system into a decimal system, $\oplus$ represents an XOR operator symbol, and a calculation method is shown as Formula (4):

$$\begin{cases} X_0 = bin2dec(K_1' \oplus K_2')/256 \\ Y_0 = bin2dec(K_1' \oplus K_3')/256 \\ x_0 = bin2dec(K_1' \oplus K_4')/256 \\ \mu = bin2dec(K_2' \oplus K_3')/256 + 1 \\ \beta = bin2dec(K_3' \oplus K_4')/512 \end{cases} \quad (4)$$

Performing N+S iterations according to the initial values of the chaotic system and the number of vertex coordinates of the single vector geographic element or the total number of vertex coordinates of the vector data, where S represents the number of vertex coordinates of the single element or the sum of vertex coordinates of the entire vector data.

Discarding the previous N iterations, which is marked as $S=\{l_1, l_2, \ldots, l_n\}$, and rounding the chaotic sequence in S according to Formula (5), where mod represents a remainder operator, $\lfloor \; \rfloor$ represents a downward rounding operator, $l_i$ represents an iteration value, and n represents the number of vertex coordinates of the single element or the sum of vertex coordinates of the entire vector data:

$$L_i = \mathrm{mod}(\lfloor (l_i \times n) \rfloor, n), i \in \{1, 2, \ldots n\} \quad (5).$$

Performing scrambling encryption on the storage sequence of the vertex coordinates of the vector geographic data elements by using the chaotic sequences in order from 1 to n first, and then performing scrambling recombination on X and Y values of the vertex coordinates by using different chaotic sequences.

With each scrambling, update the set of the vertex coordinates. The results are shown FIG. 4A-FIG. 5C.

Decryption example of vector geographic data:

Reading the vector geographic data to be decrypted.

Generating the same chaotic sequence on the basis of the aforementioned encryption method for vector geographic data.

Performing reverse scrambling recombination on the X and Y values of the vertex coordinates of the vector geographic data elements by using different chaotic sequences in order from n to 1 first, and then performing reverse scrambling decryption on the storage sequence of the vertex coordinates by using the chaotic sequence.

The above description of the disclosed examples enables professionals skilled in the art to achieve or use the present disclosure. Various modifications to these examples are readily apparent to professionals skilled in the art, and the general principles defined herein may be implemented in other examples without departing from the spirit or scope of the present disclosure. Therefore, the present disclosure is not limited to the examples shown herein but falls within the widest scope consistent with the principles and novel features disclosed herein.

What is claimed is:

1. A zero watermark generation method for vector geospatial data, comprising:

performing Arnold scrambling on a copyright image to obtain a binary copyright matrix;

performing coordinate system transformation on a vector geospatial element set to obtain a transformed vector geospatial element set;

performing random combination on vector geospatial elements in pairs;

calculating a watermark index according to the vertex coordinate number of two elements randomly combined;

establishing an index relationship between each bit of watermark information and the feature matrix by means of the following formula, wherein in the formula, index is a watermark bit index, $N_w$ represents a length of one-dimensional watermark information, the length of the one-dimensional watermark information is equal to a size of the copyright image, n represents a total number of vector geographic elements, and $N_i$ and $N_j$ represent numbers of vertexes of different vector geographic elements in a combination;

$$\text{index} = (N_i \times N_j) \bmod N_w, i,j \in \{0,1, \ldots n-1\} \text{ and } i \neq j$$

based on a voting principle, constructing a feature matrix by comparing whether the parity of the vertex coordinate numbers of the two elements randomly combined is the same, wherein a specific calculation method of the voting principle is shown in the following formula, in the formula, index is a watermark bit index, and W' represents an integer sequence;

$$W'(\text{index}) = \begin{cases} W'(\text{index}) + 1, & \text{if } \mathrm{mod}(N_i, 2) = \mathrm{mod}(N_j, 2) \\ W'(\text{index}) - 1, & \text{if } \mathrm{mod}(N_i, 2) \neq \mathrm{mod}(N_j, 2) \end{cases}$$

performing binarization on the integer sequence W' to form a one-dimensional feature matrix according to the following formula; and $$W'(\text{index}) = \begin{cases} 1, & \text{if } W'(\text{index}) > 0 \\ 0, & \text{if } W'(\text{index}) \leq 0 \end{cases}$$

performing an XOR operation on the feature matrix and the binary copyright matrix to obtain a zero watermark image.

2. A zero watermark information detection method, comprising:

generating a feature matrix on the basis of the zero watermark generation method for vector geospatial data according to claim 1;

performing an XOR operation on the feature matrix and the zero watermark image;

performing Arnold reverse scrambling on a result of the XOR operation to obtain a copyright image to be detected; and calculating similarity between the copyright image to be detected and an original copyright image.

3. An encryption method for vector geospatial data, comprising:

reading the vector geospatial data, and performing coordinate system transformation on a vector geospatial element set to obtain a transformed X and Y vector geospatial element coordinate set;

performing a hash operation on an initial key provided by a user by using an SHA-256 hash method, taking obtained 256-bit hash values as keys of a chaotic system and dividing same into 32 groups, and transforming same into a decimal system respectively;

calculating an auxiliary parameter d by using formula d=mod((sum×255), 32), comparing all values of 32 integers with the dth digit, setting the value as 1 if the value is greater than d, or else setting the value as 0, wherein mod represents a remainder operator, and sum represents the total number of coordinates of the vector geospatial data;

dividing comparison results into 4 groups which is represented by $K_1'$, $K_2'$, $K_3'$, $K_4'$ respectively, and combining same in pairs, so as to correspond to 5 parameters in a double chaotic system, namely, three chaotic variables $X_0$, $Y_0$, $x_0$ and two control variables $\mu$, $\beta$ of the double chaotic system; performing decimal transformation in sequence as initial values of the double chaotic system, and generating chaotic sequences by means of iterations, wherein the bin2dec function transforms a binary system into a decimal system, $\oplus$ represents an XOR operator symbol, and a calculation method is shown in the following formula:

$$\begin{cases} X_0 = bin2dec(K'_1 \oplus K'_2)/256 \\ Y_0 = bin2dec(K'_1 \oplus K'_3)/256 \\ x_0 = bin2dec(K'_1 \oplus K'_4)/256 \\ \mu = bin2dec(K'_2 \oplus K'_3)/256 + 1 \\ \beta = bin2dec(K'_3 \oplus K'_4)/512 \end{cases}$$

performing N+S iterations according to the initial values of the chaotic system and the number of vertex coordinates of a single vector geospatial element or the total number of vertex coordinates of the vector data, wherein N represents the number of iterations which are set independently and need to be discarded, such that the generated chaotic sequence is capable of being uniformly distributed, when a single vector geospatial element is encrypted in turn, S represents the number of vertex coordinates of the single element, and when all vector geospatial elements are simultaneously encrypted, S represents the sum of vertex coordinates of the entire vector geospatial data;

discarding the previous N iterations, which is marked as L={$l_1, l_2, \ldots, l_n$}, wherein L represents the chaotic sequence after the N iterations are discarded, and rounding the chaotic sequence in L according to the following formula, wherein mod represents a remainder operator, $\lfloor \; \rfloor$ represents a downward rounding operator, $l_i$ represents an iteration value, n represents the number of vertex coordinates of the single element or the sum of vertex coordinates of the entire vector data, and $L_i$ represents a chaotic sequence set after downward rounding; and $L_i = \mathrm{mod}(\lfloor (l_i \times n) \rfloor, n), i \in \{1, 2, \ldots n\}$ performing scrambling encryption on the storage sequence of the vertex coordinates of the vector geospatial data elements by using the chaotic sequences in order from 1 to n first, and then performing scrambling recombination on X and Y values of the vertex coordinates by using different chaotic sequences.

4. A decryption method for vector geospatial data, comprising:

reading the vector geospatial data to be decrypted;

generating a chaotic sequence identical to encryption on the basis of the encryption method for vector geospatial data according to claim 3; and performing reverse scrambling recombination on the X and Y values of the vertex coordinates of the vector geospatial data elements by using different chaotic sequences in order from n to 1 first, and then performing reverse scrambling decryption on the storage sequence of the vertex coordinates by using the chaotic sequence.

5. A commutative encryption and watermarking method based on a chaotic system and a zero watermark for vector geospatial data, comprising: reading the vector geospatial data;

performing zero watermark image construction on the basis of the zero watermark generation method for vector geospatial data according to claim 1; and performing encryption on the vector geographic data on the basis of the encryption method for vector geospatial data, wherein the sequence of zero watermark image construction and vector geographic data encryption is commutative.

* * * * *